US010374293B2

(12) United States Patent
Patel et al.

(10) Patent No.: US 10,374,293 B2
(45) Date of Patent: *Aug. 6, 2019

(54) DUPLEXED PHASED ARRAY ANTENNAS

(71) Applicant: CommScope Technologies LLC, Hickory, NC (US)

(72) Inventors: Sammit Patel, Dallas, TX (US); Morgan C. Kurk, Sachse, TX (US); XiaoHua Hou, Shanghai (CN); Giuseppe Resnati, Seregno (IT)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/901,971

(22) Filed: Feb. 22, 2018

(65) Prior Publication Data

US 2018/0212315 A1 Jul. 26, 2018

Related U.S. Application Data

(63) Continuation of application No. 15/389,622, filed on Dec. 23, 2016, now Pat. No. 9,972,893.

(60) Provisional application No. 62/272,321, filed on Dec. 29, 2015.

(51) Int. Cl.

| | |
|---|---|
| ***H01Q 1/24*** | (2006.01) |
| ***H01Q 3/36*** | (2006.01) |
| ***H01Q 3/40*** | (2006.01) |
| ***H01Q 21/28*** | (2006.01) |
| ***H01Q 5/42*** | (2015.01) |
| *H04B 1/46* | (2006.01) |

(52) U.S. Cl.
CPC ............... *H01Q 1/246* (2013.01); *H01Q 3/36* (2013.01); *H01Q 3/40* (2013.01); *H01Q 5/42* (2015.01); *H01Q 21/28* (2013.01)

(58) Field of Classification Search
CPC . H01Q 3/26; H01Q 5/00; G01S 7/034; H04B 1/18; H04B 1/44
USPC ........................................................... 455/78
See application file for complete search history.

(56) References Cited

U.S. PATENT DOCUMENTS

| | | | |
|---|---|---|---|
| 4,823,136 | A | 4/1989 | Nathanson et al. |
| 7,327,702 | B2 | 2/2008 | Lucidarme |
| 7,400,296 | B2 | 7/2008 | Haskell |
| 7,425,928 | B2 | 9/2008 | Chiang et al. |
| 7,538,740 | B2 | 5/2009 | Korisch et al. |
| 7,868,823 | B2 | 1/2011 | Haskell |
| 8,174,442 | B2 | 5/2012 | Haskell |
| 8,289,910 | B2 | 10/2012 | Gabriel et al. |
| 8,344,826 | B2 | 1/2013 | Rossiter et al. |
| 8,391,377 | B2 | 3/2013 | Zhu et al. |
| 8,489,041 | B2 | 7/2013 | Teillet et al. |
| 8,731,616 | B2 | 5/2014 | Kenington et al. |
| 8,879,997 | B2 | 11/2014 | Barker et al. |
| 8,928,528 | B2 | 1/2015 | Harel et al. |
| 9,014,068 | B2 | 4/2015 | Linehan et al. |
| 2008/0225931 | A1 | 9/2008 | Proctor, Jr. et al. |
| 2012/0120991 | A1 | 5/2012 | Seo et al. |

(Continued)

*Primary Examiner* — Lee Nguyen
(74) *Attorney, Agent, or Firm* — Myers Bigel, P.A.

(57) ABSTRACT

Multi-band antennas include one or more duplexers configured to provide isolation of non-linearities generated along a downlink path of RF signals transmitted from the multi-band antenna from an uplink path of RF signals received by the multi-band antenna.

19 Claims, 5 Drawing Sheets

(56) References Cited

U.S. PATENT DOCUMENTS

| | | | | |
|---|---|---|---|---|
| 2012/0194296 | A1 * | 8/2012 | Unlu | H01P 1/184 333/156 |
| 2013/0044650 | A1 | 2/2013 | Barker et al. | |
| 2014/0104014 | A1 | 4/2014 | Hoover et al. | |
| 2014/0213322 | A1 | 7/2014 | Pu et al. | |
| 2014/0293840 | A1 | 10/2014 | Beale | |
| 2014/0307599 | A1 | 10/2014 | Rousu | |
| 2015/0029904 | A1 | 1/2015 | Khojastepour et al. | |
| 2015/0146582 | A1 | 5/2015 | Galan et al. | |
| 2017/0187099 | A1 | 6/2017 | Patel et al. | |

* cited by examiner

DUPLEXED PHASED ARRAY ANTENNAS

CROSS-REFERENCE TO RELATED APPLICATION

The present application claims priority under 35 U.S.C. § 120 to U.S. patent application Ser. No. 15/389,622, filed, Dec. 23, 2016, which in turn claims priority under 35 U.S.C. § 119 to U.S. Provisional Patent Application Ser. No. 62/272,321, filed, Dec. 29, 2015, the entire content of each of which is incorporated herein by reference in its entirety.

BACKGROUND

Various aspects of the present disclosure relate to base station antennas, and, more particularly, to a duplexed phase array antennas.

Cellular mobile operators are using more frequency bands and increasingly more spectrum within each frequency band to accommodate increased subscriber traffic and for the deployment of new radio access technologies. Consequently, there is currently a strong demand for multi-band base station antennas that operate in two or more frequency bands.

Based on network coverage requirements, operators often have to adjust the vertical radiation pattern or "antenna beam" of an antenna, i.e. the radiation pattern's cross-section in the vertical plane. When required, alteration of the vertical angle of the antenna's main beam, also known as the "elevation angle," is used to adjust the coverage area of the antenna. Adjusting the elevation angle has been implemented both mechanically and electrically through the use of phase shifters.

SUMMARY OF THE DISCLOSURE

Aspects of the present disclosure are directed to an antenna including one or more duplexers that are configured to isolate RF signals received by the antenna from non-linearities generated by RF signals transmitted from the antenna. This segregation of transmit and receive signals may allow for relaxed passive intermodulation (PIM) distortion requirements, making possible the use of feed networks employing alternative phase shifter circuit topologies. In one aspect, an antenna may include at least one first duplexer coupled to an input of the antenna; at least one first phase shifter and at least one second phase shifter, each of the at least one first phase shifter and the at least one second phase shifters being coupled to the at least one first duplexer, and at least one second duplexer coupled to the at least one first phase shifter and one or more radiating elements of the antenna.

BRIEF DESCRIPTION OF THE DRAWINGS

The following detailed description of the invention will be better understood when read in conjunction with the appended drawings, in which example embodiments of the invention are shown. It should be understood, however, that the invention is not limited to the precise arrangements and instrumentalities shown.

DETAILED DESCRIPTION

Certain terminology is used in the following description for convenience only and is not limiting. Unless specifically set forth herein, the terms "a," "an" and "the" are not limited to one element, but instead should be read as meaning "at least one."

Figure 1:
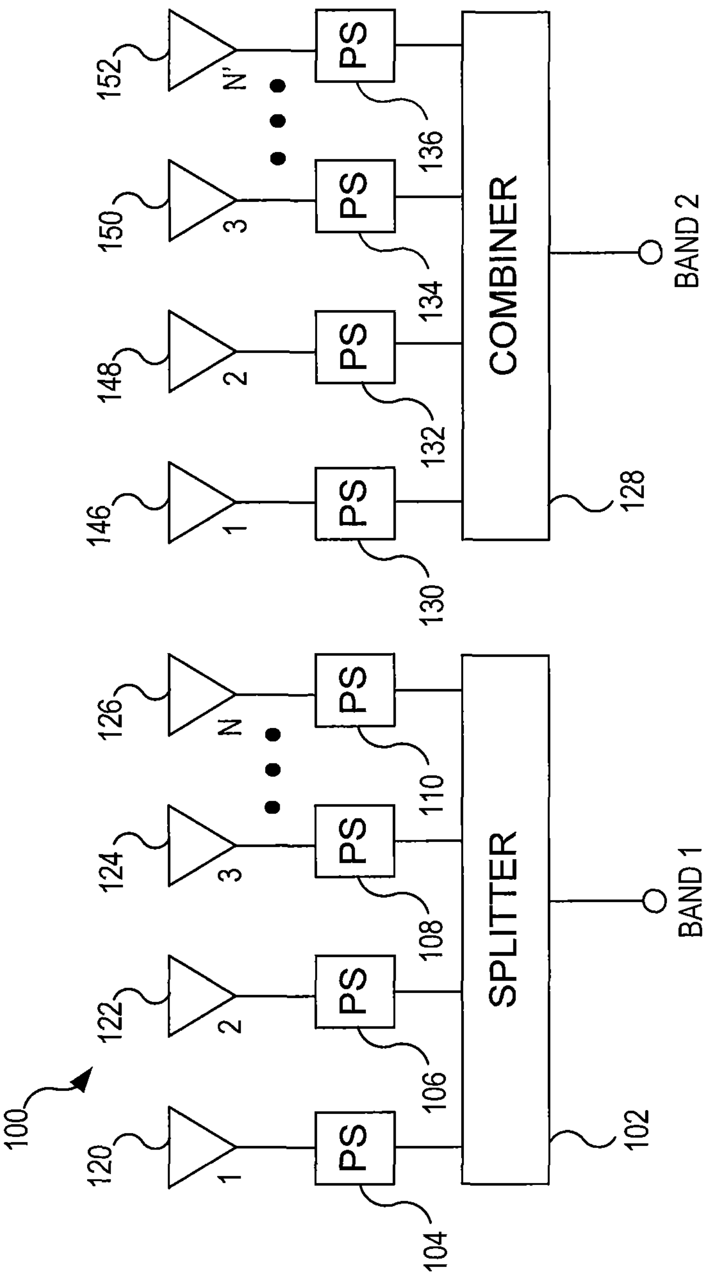
FIG. 1 is a schematic block diagram of a conventional multi-band antenna.

FIG. 1 is a schematic block diagram of a conventional multi-band antenna 100. Each frequency band supported by the multi-band antenna 100 may include a transmit sub-band and a receive sub-band in some embodiments.

As shown in FIG. 1, for a first supported frequency band (e.g., Band 1), the multi-band antenna 100 may include a splitter 102, a plurality of phase shifters 104, 106, 108, 110 and an array of radiating elements 120, 122, 124, 126. The radiating elements 120, 122, 124, 126 may be arranged as a single vertical column of radiating elements (a vertical array) or as multiple vertical columns of radiating elements. It will also be appreciated that some or all of the radiating elements 120, 122, 124, 126 may comprise sub-arrays of two or more individual radiating elements that are fed the same signal. While four radiating elements (or sub-arrays of radiating elements) 120, 122, 124, 126 are illustrated in FIG. 1, any appropriate number of radiating elements/sub-arrays may be included in the antenna 100 for the first supported frequency band Band 1.

An input, for example, from a base station, may be coupled to an input of the splitter 102. The splitter 102 may include a plurality of outputs, each of which may be coupled to an input of one of the plurality of phase shifters 104, 106, 108, 110. Outputs of the plurality of phase shifters 104, 106, 108, 110 may be coupled to respective ones of the sub-arrays of radiating elements 120, 122, 124, 126. In some embodiments, a single phase shifter circuit may be used to implement the splitter 102 and the phase shifters 104, 106, 108, 110, as will be discussed below with reference to FIG. 5.

The same arrangement described above may apply to additional bands supported by the multi-band antenna 100. For example, a second supported frequency band (e.g., Band 2) may include a splitter 128, a plurality of phase shifters 130, 132, 134, 136, and an array of radiating elements 146, 148, 150, 152 (which may each be a single radiating element or a sub-array of radiating elements). These components of Band 2 may be connected in a fashion similar to that of Band 1.

As shown in FIG. 1, the multi-band antenna 100 phase shifts combined RF signals in each frequency band that include transmit and receive band signals together, making the multi-band antenna 100 prone to PIM issues generated by phase shifters or other components of the multi-band antenna 100.

Aspects of the present disclosure are directed to antennas that include one or more duplexers that are configured to isolate RF signals received by the antenna from non-linearities generated by RF signals transmitted by the antenna. This segregation of transmit and receive signals may allow for a reduction of the above discussed PIM issues, making possible the use of feed networks employing alternative phase shifter circuit topologies.

Figure 2:
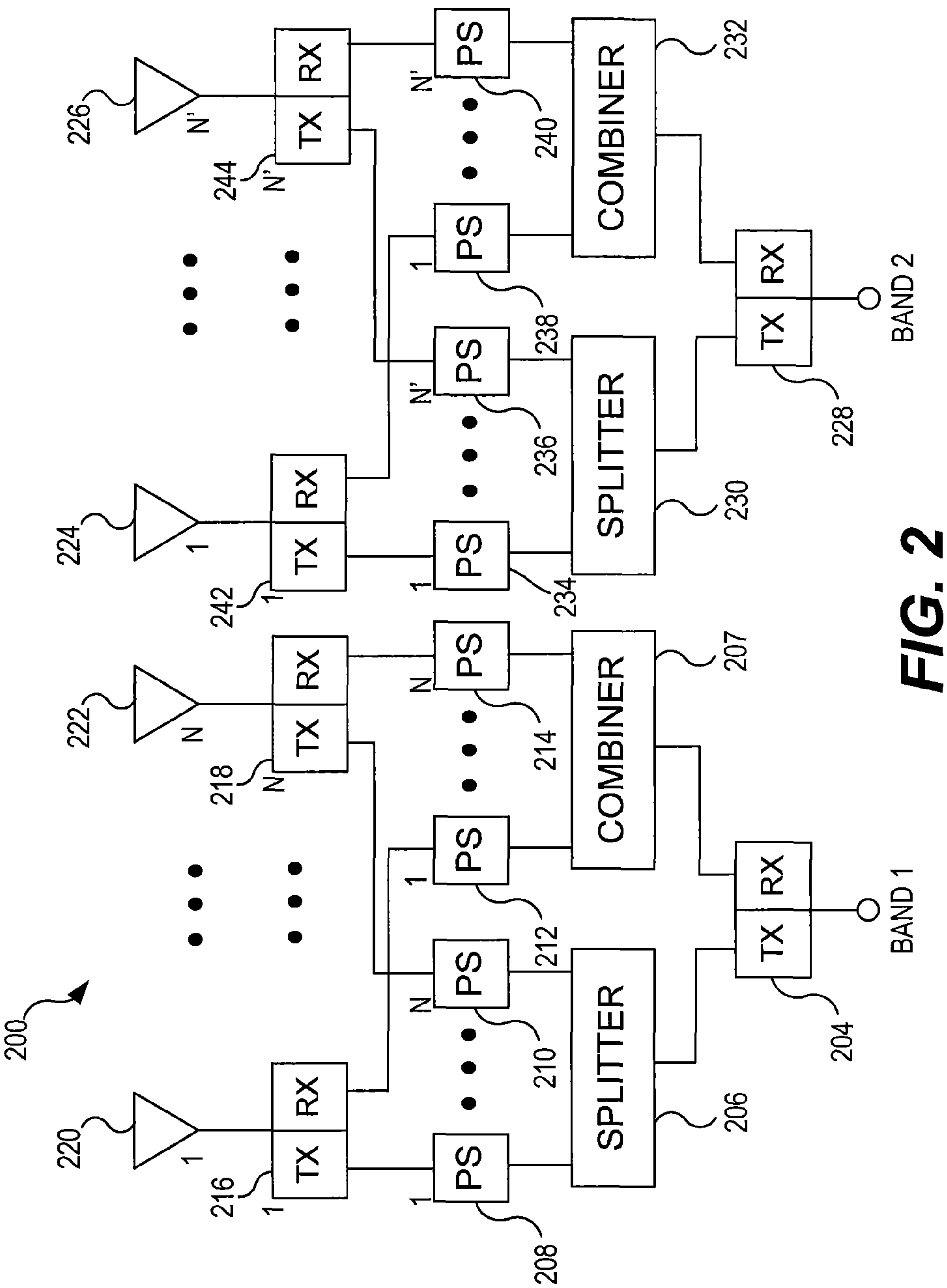
FIG. 2 is a simplified block diagram of multi-band antenna according to an aspect of the present disclosure.

FIG. 2 is a multi-band antenna 200 according to an aspect of the present disclosure. For a first supported frequency band (e.g., Band 1), the multi-band antenna 200 may include a first duplexer 204, a splitter 206, a combiner 207, a plurality of phase shifters 208, 210, 212, 214, a plurality of second duplexers 216, 218, and a plurality of radiating elements 220, 222. Each of the radiating elements 220, 222 may comprise a single radiating element or may comprise a sub-array that includes multiple radiating elements. As shown in FIG. 2, a total of N sub-arrays of radiating elements, N phase shifters and 2*N second duplexers may be provided in some embodiments.

An input, for example, from a base station radio such as, for example, a remote radio head (not shown), may be coupled to an input of the first duplexer 204. The first duplexer 204 may be configured to pass RF signals that are to be transmitted (e.g., RF signals to be transmitted from the multi-band antenna 200 on a downlink path) to the splitter 206 to which it is coupled. The splitter 206 may be configured to split an RF signal that is to be transmitted into a plurality of sub-components that are passed to the respective phase shifters 208, 210. Each of the phase shifters 208, 210 may be configured to phase shift a respective one of the sub-components of the RF signal that is to be transmitted. Because each of the phase shifters 208, 210 may phase shift the respective sub-components of RF signals in the first frequency band that are to be transmitted separate from the sub-components of RF signals in the first frequency band that are received by the radiating elements 220, 222, a degree of isolation may be achieved between the RF signals that are to be transmitted by the multi-band antenna 200 and the RF signals that are received at the multi-band antenna 200. The phase shifted transmit signals may be output to the respective second duplexers 216, 218, each of which may be coupled to a respective one of the sub-arrays of radiating elements 220, 222, for transmission from the multi-band antenna 200.

For reception of RF signals in the first supported frequency band, the second duplexers 216, 218 may receive the respective sub-components of an RF signal from the respective radiating elements 220, 222. The one or more second duplexers 216, 218 may be configured to isolate the sub-components of the received RF signal from the respective sub-components of any transmitted RF signals. The sub-components of the received RF signal may then be provided to the respective phase shifters 212, 214. Each of the phase shifters 212, 214 may be configured to phase shift a respective one of the sub-components of the received RF signal. Because each of the phase shifters 212, 214 may phase shift the sub-components of the received RF signal separate from the sub-components of any transmitted RF signals, a degree of isolation is provided (that is proportional to the transmit/receive isolation within the second duplexers 216, 218) for the sub-components of the received RF signal from the non-linearities generated along the high-power transmit (downlink) path, thereby significantly reducing the effect of such non-linearities on the received RF signal. The phase shifted sub-components of the received RF signal may be output to the combiner 207. The combiner 207 may be configured to combine the phase shifted sub-components of the received RF signal. The combined received RF signal that is output by the combiner 207 may be provided to the first duplexer 204, which may be coupled to a radio such as a remote radio head (not shown).

The same arrangement described above for Band 1 may apply to additional bands supported by the multi-band antenna 200. For example, a second supported frequency band (e.g., Band 2) may include a third duplexer 228, a second splitter 230, a second combiner 232, a second plurality of phase shifters 234, 236, 238, 240, a plurality of fourth duplexers 242, 244, and an array of radiating elements 224, 226. Each of the radiating elements 224, 226 may comprise a single radiating element or may comprise a sub-array that includes multiple radiating elements.

An input from, for example, a transmit port of a radio (not shown), may be coupled to an input of the third duplexer 228. The third duplexer 228 may be configured to pass RF signals that are to be transmitted to the splitter 230 to which it is coupled. The splitter 230 may be configured to split the RF signal that is to be transmitted into a plurality of sub-components that are passed to the respective phase shifters 234, 236. Each of the phase shifters 234, 236 may be configured to phase shift a respective one of the sub-components of the RF signal that is to be transmitted. Because each of the phase shifters 234, 236 may phase shift the sub-components of the RF signals that are to be transmitted separate from the sub-components of the RF signals that are received by the radiating elements 224, 226, a degree of isolation may be achieved between the RF signals that are to be transmitted by the multi-band antenna 200 and the RF signals that are received at the multi-band antenna 200. The phase shifted transmit signals may be output to the respective fourth duplexers 242, 244, each of which may be coupled to one of the radiating elements/sub-arrays 224, 226 for transmission from the multi-band antenna 200.

For reception of RF signals, the fourth duplexers 242, 244 may receive the sub-components of a received RF signal from the respective radiating elements/sub-arrays 224, 226. The fourth duplexers 242, 244 may be configured to isolate the sub-components of the received RF signals from the respective sub-components of the transmitted RF signals. The sub-components of a received RF signal may then be provided to the respective phase shifters 238, 240. Each of the phase shifters 238, 240 may be configured to phase shift the respective sub-components of the received RF signal. Because each of the phase shifters 238, 240 may phase shift the respective sub-components of the received RF signal separate from the sub-components of the transmitted RF signals, a degree of isolation is provided (that is proportional to the transmit/receive isolation within the fourth duplexers 242, 244) for the sub-components of the received RF signals from the non-linearities generated along the high-power transmit (downlink) path, thereby significantly reducing the effect of such non-linearities on the received RF signals. The phase shifted sub-components of the received RF signal may be output to the combiner 232. The combiner 232 may be configured to combine the phase shifted sub-components of the received RF signal. The combined received RF signal that is output by the combiner 232 may be provided to the third duplexer 228, which may be coupled to a radio (not shown).

Other configurations are contemplated as well. For example, as shown in FIG. 3, aspects of the present disclosure may employ multi-band duplexers 326, 328.

Figure 3:
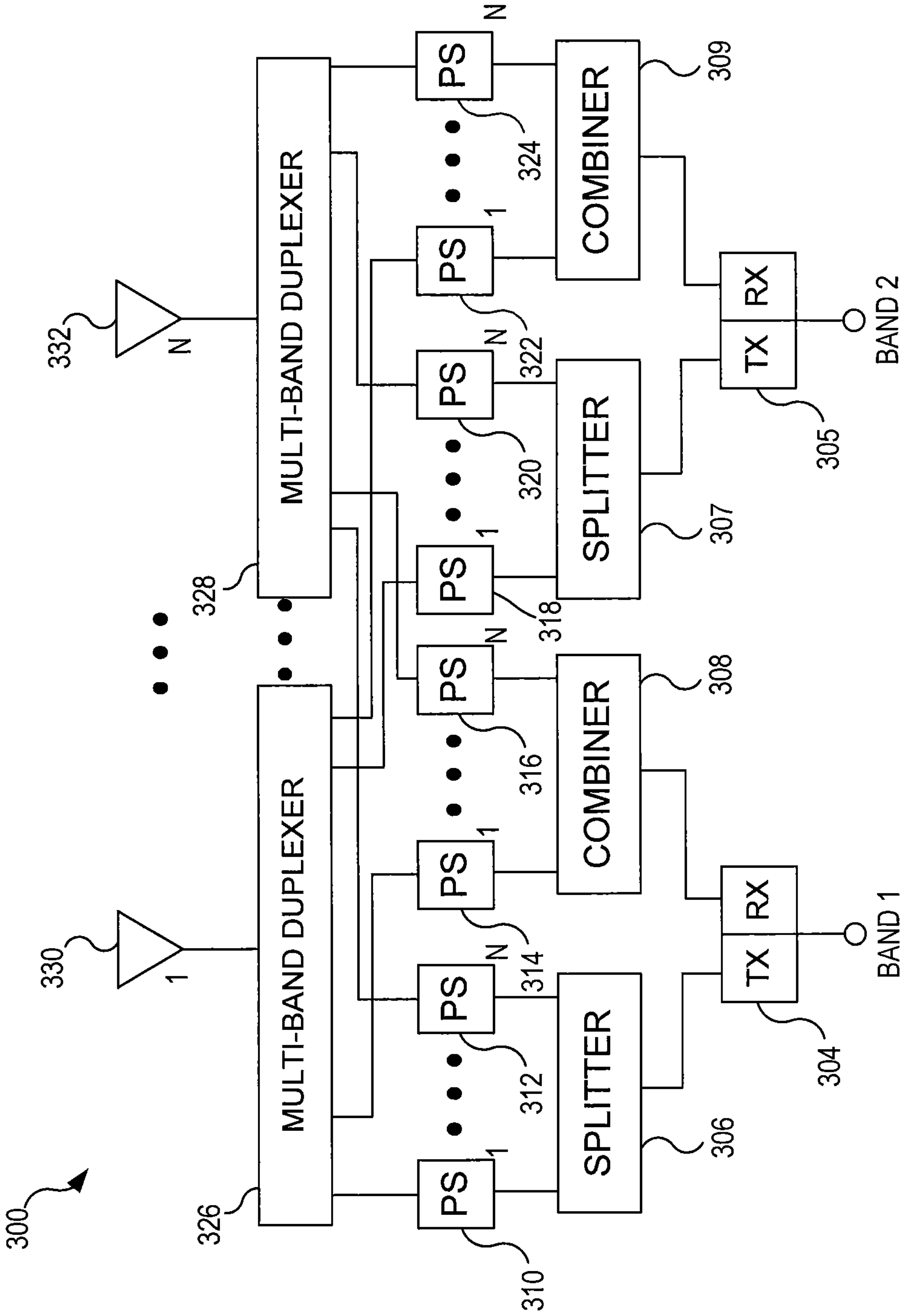
FIG. 3 is a simplified block diagram of a multi-band antenna employing multi-band duplexers, according to an aspect of the present disclosure.

In particular, FIG. 3 is a schematic block diagram that illustrates a multi-band antenna 300 according to another aspect of the present disclosure. The multi-band antenna 300 may include first and second duplexers 304, 305, first and second splitters 306, 307, first and second combiners 308, 309, a plurality of phase shifters 310, 312, 314, 316, 318, 320, 322, 324, first and second multi-band duplexers 326, 328 and radiating elements 330, 332. Each of the radiating elements 330, 332 may comprise a single radiating element or may comprise a sub-array of multiple radiating elements. Each radiating element may be configured for transmission and/or reception of RF signals in multiple frequency bands. For example, the one of more radiating elements 330, 332 may each be configured to transmit and receive RF signals in both a first frequency band and a second frequency band.

First and second frequency band inputs, for example, from first and second radios (not shown), may be coupled to inputs of the respective first and second duplexers 304, 305. The first and second duplexers 304, 305 may be configured to output isolated transmit signals (e.g., RF signals to be transmitted from the multi-band antenna 300 on a downlink path) to respective splitters 306, 307 to which they are coupled. Each splitter 306, 307 may split an RF signal to be transmitted that is input thereto into a plurality of sub-components, and the sub-components may be fed to the respective phase shifters 310, 312; 318, 320. Each of the phase shifters 310, 312; 318, 320 may be configured to phase shift a respective one of the sub-components of the RF signals that are to be transmitted in the respective first and second frequency bands. Because each of the phase shifters 310, 312; 318, 320 may phase shift the RF signals that are to be transmitted separate from any received RF signals, a degree of isolation from the received RF signals may be achieved. The phase shifted sub-components of the RF signals that are to be transmitted may be output to the respective multi-band duplexers 326, 328. The first and second multi-band duplexers 326, 328 may be coupled to the respective radiating elements 330, 332. Each of the multi-band duplexers 326, 328 may be configured to operate in more than one frequency band. For example, each of the multi-band duplexers 326, 328 may isolate transmit signals of a plurality of frequency bands from receive signals of the plurality of frequency bands.

For reception of RF signals, the first and second multi-band duplexers 326, 328 may receive respective sub-components of received RF signals from the radiating elements 330, 332. The first and second multi-band duplexers 326, 328 may be configured to isolate the sub-components of received RF signals from the sub-components of the RF signals that are to be transmitted in each frequency band. Accordingly, the sub-components of a received RF signal in the first frequency band may be provided to the respective phase shifters 314, 316. The sub-components of a received RF signal in the second frequency band may be provided to the respective phase shifters 322, 324. The phase shifters 314, 316; 322, 324 may be configured to phase shift the isolated sub-components of the respective received RF signals. Because each of the phase shifters 314, 316; 322, 324 may phase shift the sub-components of the received RF signals separate from the sub-components of the RF signals to be transmitted, a degree of isolation may be achieved (which is proportional to the transmit/receive isolation within the first and second multi-band duplexers 326, 328) from the non-linearities generated along the high-power downlink path. The phase shifted received RF signals may be output to the respective combiners 308, 309. The combiners 308, 309 are configured to combine the received and phase shifted RF signals, and the combined signals are provided to the respective first and second duplexers 304, 305 which may be coupled to respective radios for the first and second frequency bands (not shown).

Figure 4:
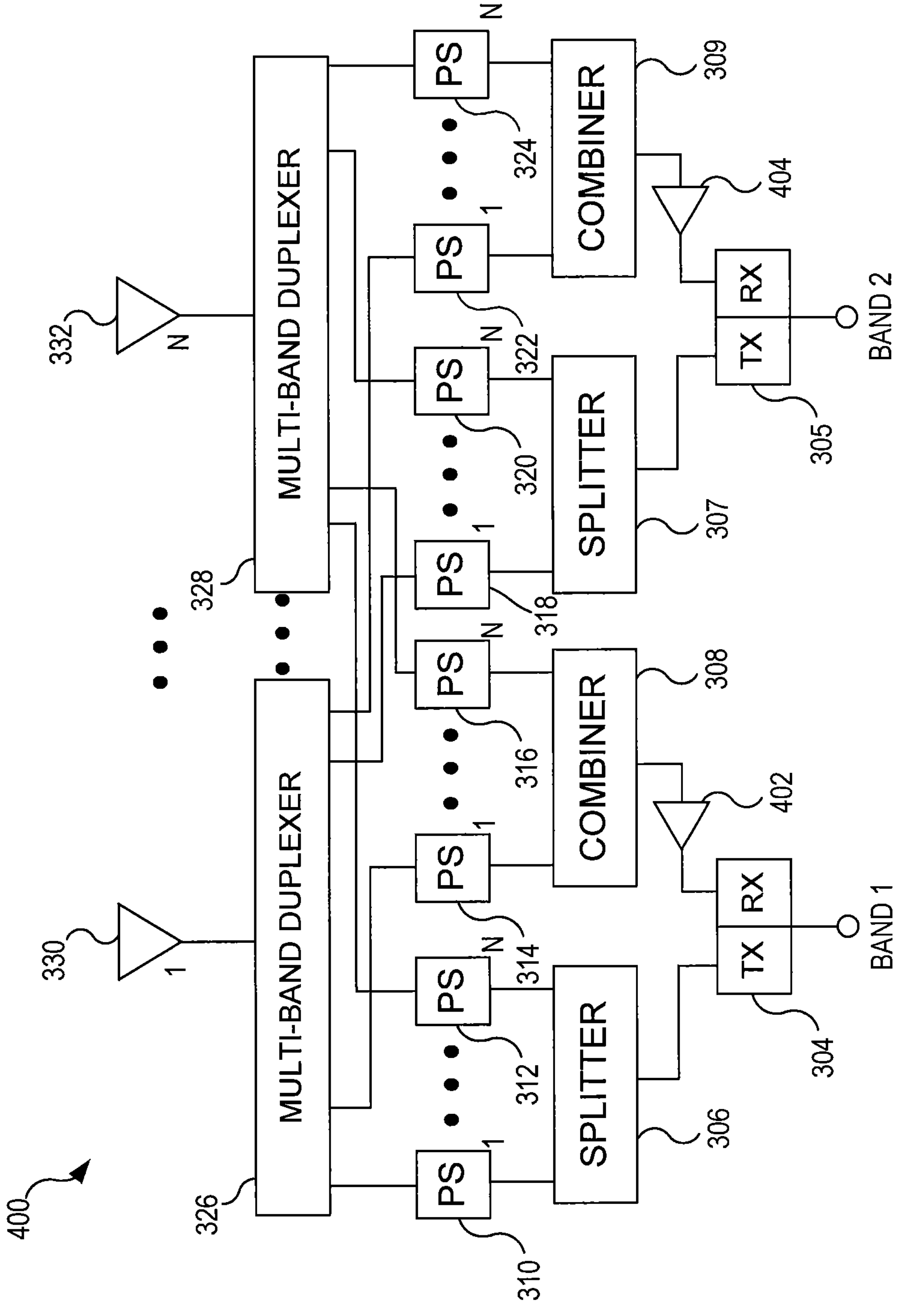
FIG. 4 is a simplified block diagram of a multi-band antenna employing multi-band duplexers as well as low noise amplifiers, according to an aspect of the present disclosure.

By incorporating duplexers into the base station antenna in the example manner discussed above with reference to FIGS. 2 and 3, it also becomes possible to include low noise amplifiers within the base station antenna. Low noise amplifiers are often employed to counter the effects of a high noise figure that may be introduced by a feeder cable that connects the radio to the antenna. Incorporating the low noise amplifier within the base station antenna may be advantageous for several reasons. Currently, low noise amplifiers are typically mounted as separate units on the tower or other elevated structure on which the base station antennas are typically mounted. Separate charges typically apply for each piece of equipment that is separately mounted on the tower, and hence the low noise amplifiers may increase the installation costs. Additionally, each separately mounted piece of equipment requires its own housing, connectors, mounting brackets and the like, which increases the size, weight and cost of the totality of the tower-mounted equipment. Moreover, local zoning ordinances may limit the number of separately-mounted pieces of equipment on an antenna tower, and increases in the number of such units can be unsightly. By incorporating the low noise amplifiers into the base station antennas, it may be possible to reduce the overall size and weight of the tower-mounted equipment, reduce the number of connections that must be performed by technicians during installation (which can be sources of interference such as PIM distortion or which can be done incorrectly and have to be fixed), reduce the installation costs and provide a more aesthetic overall appearance As shown in FIG. 4, pursuant to further embodiments of the inventive concepts, low noise amplifiers may be integrated into the base station antennas according to embodiments of the present invention. In particular, FIG. 4 is a schematic block diagram of a base station 400 that has a similar configuration to the base station antenna 300, but which further includes a low noise amplifier 402 that is connected between the combiner 308 and the duplexer 304 and a low noise amplifier 404 that is connected between the combiner 309 and the duplexer 305. It will be appreciated that low noise amplifiers could similarly be added in the same location to the multi-band antenna 200 of FIG., 2 in further embodiments of the present invention.

Figure 5:
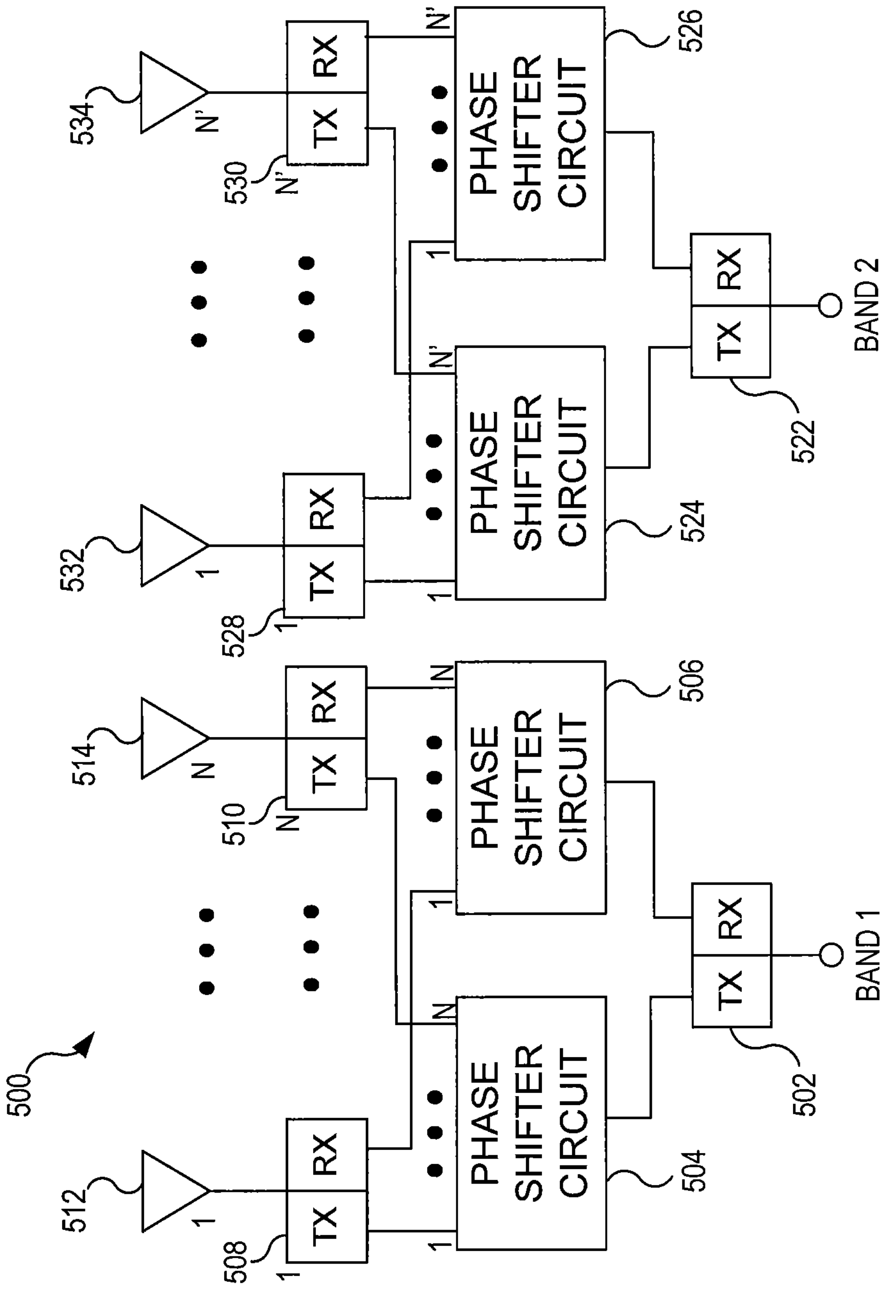
FIG. 5 is a schematic block diagram of a multi-band base station antenna according to further embodiments of the present invention.

FIG. 5 is a schematic block diagram of a multi-band base station antenna 500 according to further embodiments of the present invention. The multi-band antenna 500 is similar to the multi-band 200 that is shown in FIG. 2, except that the multi-band antenna 500 includes phase shifter circuits 504, 506, 524, 526 that each act as both a splitter or combiner and as a phase shifter. Such phase shifter circuits are well known in the art. For example, U.S. Pat. No. 8,674,788 discloses a wiper arm phase shifter circuit that receives, for example, a downlink path RF signal, splits the downlink path RF signal into a plurality of sub-components, and applies a different phase shift to each of these sub-components. The wiper arm phase shifter of U.S. Pat. No. 8,674,788 may likewise be used to receive the sub-components of a received RF signal, phase shift the received sub-components, and then combine the received sub-components.

As shown in FIG. 5, an RF signal that is in a first frequency band (Band 1) that is to be transmitted via antenna 500 may be received at a first duplexer 502. The first duplexer may pass the RF signal to be transmitted to the phase shifter circuit 504. The phase shifter circuit 504 splits the RF signal to be transmitted into a plurality of sub-components, phase shifts each of the sub-components (typically by different amounts), and passes the phase shifted sub-components to the transmit ports of respective ones of a plurality of second duplexers 508, 510. The sub-components are passed by the duplexers to the respective radiating elements 512, 514 for transmission.

RF signals in the first frequency band that are incident on antenna 500 are received at each of the radiating elements 512, 514. The sub-components of the received RF signal that are received at each radiating element 512, 514 are passed to the respective duplexers 508, 510, which pass the received sub-components to the phase shifter circuit 506. The phase shifter circuit 506 phase shifts each received sub-component and then combines the phase shifted received sub-components to provide a combined received RF signal. The combined received RF signal is passed to the first duplexer 502, which passes the received RF signal to the input port for the first frequency band. The first duplexer 522, the phase shifter circuits 524, 526, the second duplexers 528, 530 and the radiating elements 532, 534 associated with the second frequency band may operate in the same manner for RF signals that are transmitted and received in the second frequency band.

Aspects of the present disclosure may also allow for the use of various types of phase shifters in addition to, or instead of passive phase shifters, which may typically be controlled via a motor. Such passive phase shifters may typically be large in size, and, because of their motor operation, are typically slow in providing phase shifting, and, in turn, slow to adjust a vertical tilt of an antenna. Due at least in part to relaxed PIM requirements, aspects of the present disclosure allow for the use of other types of phase shifters, including but not limited to solid state phase shifters (e.g., micro electro mechanical (MEMS) type phase shifters) or piezoelectric phase shifters. These other types of phase shifters may be controlled by a DC voltage, and not a motor, allowing for dynamic and more accurate phase adjustment. Moreover, other types of phase shifters may be considerably smaller in size, and may be positioned in various locations within the antenna including being spatially closer to radiating elements of the base station antenna.

While traditional base station antennas often arrange the radiating elements as one or more vertical arrays of radiating elements, it will be appreciated that the teachings of the present invention may also be applied to base station antennas having two dimensional and/or three dimensional arrays of radiating elements. By using duplexers to isolate the transmit and receive paths for each supported frequency band from each other the impact of PIM distortion generated in the phase shifters and/or splitters/combiners may be greatly reduced, providing for improved performance and/or allowing the use of phase shifters having reduced PIM distortion performance.

Various aspects of the disclosure have now been discussed in detail; however, the invention should not be understood as being limited to these embodiments. It should also be appreciated that various modifications, adaptations, and alternative embodiments thereof may be made within the scope and spirit of the present invention.

What is claimed is:

1. A base station antenna comprising:

a first radio frequency ("RF") input port that is configured to be coupled to a base station radio;

a plurality of sub-arrays of radiating elements, each sub-array including at least one radiating element;

at least one transmit phase shifter coupled between the first RF input port and the plurality of sub-arrays of radiating elements;

at least one receive phase shifter coupled between the first RF input port and the plurality of sub-arrays of radiating elements, wherein the at least one receive phase shifter comprises at least one solid state phase shifter.

2. The base station antenna of claim 1, further comprising:

a first duplexer having a first port that is coupled to the first RF input port, a second port that is coupled to the at least one transmit phase shifter and a third port that is coupled to the at least one receive phase shifter; and a second duplexer having a first port that is coupled to a first of the sub-arrays of radiating elements, a second port that is coupled to the at least one transmit phase shifter and a third port that is coupled to the at least one receive phase shifter.

3. The base station antenna of claim 2, further comprising a low noise amplifier between the receive phase shifter and the first duplexer.

4. The base station antenna of claim 2, further comprising:

a first splitter that is coupled between the first duplexer and the at least one transmit phase shifter; and a first combiner that is coupled between the first duplexer and the at least one receive phase shifter.

5. The base station antenna of claim 2, further comprising a plurality of additional second duplexers, each of the additional second duplexers having a first port that is coupled to a respective one of the sub-arrays of radiating elements, a second port that is coupled to the at least one transmit phase shifter and a third port that is coupled to the at least one receive phase shifter.

6. The base station antenna of claim 1, wherein the at least one transmit phase shifter comprises at least one solid state phase shifter.

7. The antenna of claim 1, wherein the first RF input port is configured to pass both transmit band and receive band RF signals.

8. An antenna comprising:

a radio frequency ("RF") input port;

a transmit phase shifter;

a receive phase shifter;

a radiating element;

a first circuit element having a first port coupled to the transmit phase shifter, a second port coupled to the receive phase shifter and a third port coupled to the RF input port; and a second circuit element having a first port coupled to the transmit phase shifter, a second port coupled to the receive phase shifter and a third port coupled to the radiating element, wherein a common, transmission path that connects the third port of the first circuit element to the first RF input port is configured to pass both transmit and receive RF signals.

9. The antenna of claim 8, wherein the first circuit element is a first duplexer and the second circuit element is a second duplexer.

10. The antenna of claim 8, wherein the receive phase shifter is a solid state phase shifter.

11. The antenna of claim 8, further comprising a low noise amplifier between the receive phase shifter and the first circuit element.

12. The antenna of claim 8, further comprising:

a first splitter that is coupled between the first circuit element and the transmit phase shifter; and a first combiner that is coupled between the first circuit element and the receive phase shifter.

13. The antenna of claim 8, wherein the second circuit element comprises one of a plurality of second circuit elements, and wherein the radiating element comprises one of a plurality of radiating elements, wherein each second circuit element has a first port coupled to the transmit phase shifter, a second port coupled to the receive phase shifter and a third port coupled to a respective one of the radiating elements.

14. An antenna comprising:

a first duplexer having a first transmit port, a first receive port and a first combined port that is coupled to a first radio frequency ("RF") input of the antenna;

a second duplexer having a second transmit port, a second receive port and a second combined port that is coupled to a second RF input of the antenna;

a plurality of sub-arrays of radiating elements that each include at least one radiating element;

a plurality of multi-band duplexers, wherein each multi-band duplexer is coupled between a respective one of the sub-arrays of radiating elements and each of the first transmit port, the first receive port, the second transmit port, and the second receive port.

15. The antenna of claim 14, further comprising:

at least one transmit phase shifter coupled between the first duplexer and a first of the multi-band duplexers; and at least one receive phase shifter coupled between the first duplexer and the first of the multi-band duplexers.

16. The antenna of claim 15, further comprising:

a first splitter that is coupled between the first duplexer and the at least one transmit phase shifter; and a first combiner that is coupled between the first duplexer and the at least one receive phase shifter.

17. The antenna of claim 16, further comprising a low noise amplifier between the first combiner and the first duplexer.

18. The antenna of claim 15, wherein the at least one receive phase shifter comprises at least one solid state phase shifter.

19. The antenna of claim 14, further comprising:

at least one transmit phase shifter coupled between the second duplexer and a second of the multi-band duplexers; and at least one receive phase shifter coupled between the second duplexer and the second of the multi-band duplexers.

* * * * *